United States Patent Office 3,775,373
Patented Nov. 27, 1973

3,775,373
SEGMENTED THERMOPLASTIC COPOLYESTERS
James Richard Wolfe, Jr., Wilmington, Del., assignor to E. I. du Pont de Nemours and Company, Wilmington, Del.
No Drawing. Filed May 30, 1972, Ser. No. 257,664
Int. Cl. C08g 17/08
U.S. Cl. 260—75 R                    9 Claims

ABSTRACT OF THE DISCLOSURE

Segmented thermoplastic copolyesters containing recurring ether-ester units derived from dicarboxylic acids and poly(alkylene oxide) glycol having a molecular weight of about 150–250 and a carbon to oxygen ratio of about 1.5–2.4 and recurring ester units derived from dicarboxylic acids and low molecular weight diols. The ester units constitute about 36–85% by weight of the polymer with 30–65% by weight of the polymer being 1,4-butylene terephthalate units.

BACKGROUND OF THE INVENTION

Linear copolyesters have been produced heretofore for various purposes, particularly for the production of films and fibers, but the known polymers of this type have not been as effective as would be desired for certain applications. In particular, polymers having good molding and extrusion characteristics, superior tear strength and resistance to oil and water swell have not been available. In most instances where polymers come into contact with oil or water, e.g., a hose, or a coating there is a tendency on the part of the polymers to swell. The swelling in turn decreases the desired physical properties of the polymer such as modulus, tensile strength, flex life and tear strength. Moreover, known copolyesters generally harden very slowly from the molten state which property greatly decreases their effectiveness in injection molding and extrusion applications. There has been a need, therefore, for a thermoplastic elastomer which would combine rapid hardening rates with superior resistance to oil and water swell further combined with a high level of physical properties such as tear strength, tensile strength, flex life and abrasion resistance.

SUMMARY OF THE INVENTION

According to this invention there is provided a thermoplastic copolyester consisting essentially of a multiplicity of recurring intralinear ether-ester and ester units connected head-to-tail through ester linkages, said ether-ester units being represented by the following structure:

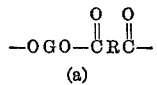
(a)

and said ester units being represented by the following structure:

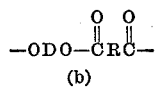
(b)

wherein:

G is a divalent radical remaining after removal of terminal hydroxyl groups from a poly(alkylene oxide) glycol having a molecular weight of about 150–250, preferably 190–240 and a carbon to oxygen ratio of about 1.5 to 2.4;

D is a divalent radical other than G remaining after removal of hydroxyl groups from a low molecular weight diol having a molecular weight less than about 250; and R is a divalent radical remaining after removal of carboxyl groups from a dicarboxlic acid having a molecular weight less than about 300;

with the provisos that about 30–65% by weight of the copolyester consists of 1,4-butylene terephthalate ester units and 0–20% by weight of the copolyester consists of additional ester units which form a homopolymer in the fiber-forming molecular weight range having a melting point of at least 100° C., said additional ester units being present in an amount of at least 6% by weight when less than 45% by weight of the copolyester consists of 1,4-butylene terephthalate ester units.

The term "ether-ester units" as applied to units in a polymer chain refers to the reaction product of a polyether glycol with a dicarboxylic acid. Such "ether-ester units," which are a repeating unit in the copolyesters of this invention, correspond to the Formula a above. The polyether glycols of the instant invention are poly(alkylene oxide) glycols having a molecular weight between about 150 and 250 and a carbon-to-oxygen ratio of about 1.5 to 2.4. Copolyesters prepared from such poly(alkylene oxide) glycols exhibit useful properties over a wide range of temperature, combined with limited water swell. Copolyesters prepared from poly(alkylene oxide) glycols having a carbon-to-oxygen ratio of about 2.0 and molecular weight in excess of about 250 have lower tear strength and have less acceptable water swell. Copolyesters prepared from glycols having molecular weights below about 150 are quite plastic in nature and are not sufficiently elastic for most uses.

The polyether glycols contain a major proportion of ethylene oxide units such that the carbon-to-oxygen ratio is about 1.5 to 2.4. In a preferred embodiment of the instant invention the polyether glycols will be entirely poly(ethylene oxide) glycol. In some instances it may be desirable to use copolymers of ethylene oxide containing minor proportions of units derived from a second alkylene oxide. Typically the second monomer will constitute less than about 40 mole percent of the poly(alkylene oxide) glycols and preferably less than 25 mole percent. Representative examples of the second monomer include 1,2- and 1,3-propylene oxides, 1,2-butylene oxide and tetrahydrofuran. It should be noted that regardless of the second monomer utilized in the poly(alkylene oxide) glycol the carbon-to-oxygen ratio must be no more than about 2.4. It is also possible to use mixtures of poly(ethylene oxide) glycol and a second poly(alkylene oxide) glycol such as poly(1,2-propylene oxide) glycol or poly(tetramethylene oxide) glycol as long as the requirement that the carbon-to-oxygen ratio is no more than about 2.4 is met.

Maximum resistance to oil swell is obtained with copolyesters based on poly(ethylene oxide) glycol alone. In some instances improvement of low temperature properties can be obtained by using poly(alkylene oxide) glycol copolymers or mixture of poly(alkylene oxide) glycols but at the expense of resistance to oil swell.

The term "ester units" as applied to units in a polymer chain refers to polymer chain units having molecular weights less than about 550. They are made by reacting a low molecular weight diol (below about 250) other than the poly(ethylene oxide) glycol with a dicarboxylic acid to form ester units represented by Formula b above.

Included among the low molecular weight diols (in addition to 1,4-butanediol) which react to form ester units are acyclic, alicyclic and aromatic dihydroxy compounds. Preferred are diols with 2–15 carbon atoms such as ethylene, propylene, isobutylene, pentamethylene, 2,2-dimethyltrimethylene, hexamethylene and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids (in addition to terephthalic acid) which are reacted with the foregoing polyether glycols and low molecular weight diols to produce the copolyesters of this invention are aliphatic, cycloaliphatic or aromatic dicarboxylic acids of a low molecular weight, i.e., having a molecular weight of less than about 300. The term "dicarboxylic acids" as used herein, includes acid equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the elastomeric compositions of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can us used for this invention are sebacic acid, 1,3-cyclohexane dicarboxylic acid, 1,4 - cyclohexane dicarboxylic acid, adipic acid, glutaric acid, succinic acid, carbonic acid, oxalic acid, azelaic acid, diethyl-malonic acid, allyl-malonic acid, 4-cyclohexene - 1,2-dicarboxylic acid, 2-ethylsuberic acid, 2,2,3,3-tetramethylsuccinic acid, cyclopentanedicarboxylic acid, decahydro - 1,5 - naphthylene dicarboxylic acid, 4,4'-bicyclohexyl dicarboxylic acid, decahydro-2,6-naphthylene dicarboxylic acid, 4,4'-methylenebis-(cyclohexyl) carboxylic acid, 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include phthalic and isophthalic acids, bibenzoic acid, substituted dicarboxy compounds with two benzene nuclei such as bis(p-carboxyphenyl) methane, p-oxy(p-carboxyphenyl) benzoic acid, ethylene-bis(p-oxybenzoic acid) 1,5-napthhalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are a preferred class for preparing the copolyester polymers useful for compositions of this invention. Among the aromatic acids, those with 8–16 carbon atoms are preferred, particularly the phenylene dicarboxylic acids, i.e., phthalic and isophthalic acids.

It is essential that 30–65% by weight of the copolyester consist of 1,4-butylene terephthalate units. Additional ester units, other than 1,4-butylene terephthalate units, can be present in amounts up to 20% by weight of the polyester and it is essential that these additional ester units be present at a level of at least about 6% when less than 45% by weight of the copolyester consists of 1,4-butylene terephthatlate ester units. It is also essential that additional ester units be derived from a low molecular weight diol and a dicarboxylic acid (or their ester-forming derivatives) which form a homopolymer having a melting point of 100° C. when the molecular weight of the homopolymer is in the fiber-forming region; that is, >5000. Such diols and dicarboxylic acids are indicated above. The melting point of the homopolymer can be readily determined by differential scanning calorimetry. Copolyesters having fewer 1,4-butylene terephthalic units than is assured by the foregoing proportions do not have sufficiently rapid hardening rates.

The dicarboxylic acids or their derivatives are incorporated into the final product in the same molar proportions as are present in the reaction mixture. The total moles of polyether glycol and low molecular weight diol (or diols) incorporated corresponds to the moles of diacid present in the reaction mixture. The amounts of polyether glycols and diol incorporated is largely a function of the amounts present, their boiling points, and relative reactivities. The actual amount of polyether glycol and diol incorporated is readily estimated from a knowledge of the amounts charged and the amounts distilled off during preparation of the polyester. The distillate can be condensed in a trap cooled with liquid nitrogen and analyzed by means such as gas chromatography.

The copolyesters of this invention contain about 36–85% by weight of ester units corresponding to Formula b, above, the remainder being ether-ester units corresponding to Formula a above. When the copolyesters contain less than about 36% by weight short chain units, the tear strength and solvent resistance of the copolyesters fall to undesirably low levels and when the copolyesters contain more than about 85% short chain units, the low temperature properties worsen and the copolyesters become less elastomeric. The preferred balance of properties is obtained when the ester unit content is about 50–62% with at least 80% of the units being butylene terephthalate units.

The most preferred copolyesters of this invention are those prepared from dimethyl terephthalate, 1,4-butanediol and poly(ethylene oxide) glycol having a molecular weight from about 190-240. Polymers prepared from these ingredients and dimethyl isophthalate are also preferred.

The polymers described herein can be made conveniently by a conventional ester interchange reaction. A preferred procedure involves heating the dimethyl ester of terephthalic acid with a polyether glycol and an excess of a butanediol in the presence of a catalyst at 150 to 260° C. followed by distilling off methanol formed by the interchange. Heating is continued until methanol evolution is complete. Depending on temperature, catalyst and glycol excess, this polymerization is complete within a few minutes to a few hours. This procedure results in the preparation of a low molecular weight prepolymer which can be carried to a high molecular weight copolyester of this invention by the procedure described below. Such prepolymers can also be prepared by a number of alternate esterification or ester interchange processes; for example, the polyether glycol can be reacted with a high or low molecular weight ester homopolymer or copolymer in the presence of catalyst until randomization occurs. The ester homopolymer or copolymer can be prepared by ester interchange from either the dimethyl esters and low molecular weight diols, as above, or from the free acids with the diol acetates. Alternatively, the ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the polyether glycol.

The resulting prepolymer is then carried to high-molecular weight by distillation of the excess of butadienediol. This process is known as "polycondensation." Additional ester interchange occurs during this distillation to increase the molecular weight and to randomize the arrangement of the copolyester units. Best results are usually obtained if this final distillation of polycondensation is run at less than 5 mm. pressure and 220–260° C. for less than 4 hours in the presence of antioxidants such as sym-di-beta-naphthyl-p-phenylene-diamine and 1,3,5-trimethyl-2,4,6-tris[3,5-ditertiarybutyl-4 - hydroxybenzyl] benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl titanate used alone or in combination with magnesium or calcium acetates are preferred. Complex titanates, such as Mg[HTi(OR)$_6$]$_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terephenyl, are conveniently removed during high polymerization by azeotropic distillation. Other special polymerization techniques, for example, interfacial polymerization of bisphenol with bisacylhalides and bisacylhalide capped linear diols, may prove useful for preparation of specific polymers. Both batch and continuous methods can be used for any stage of copolyester polymer preparation. Polycondensation of prepolymer can also be accomplished in the solid phase by heating finely divided solid preploymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess many desirable properties, it is sometimes advisable to stabilize certain of the compositions to heat or radiation by ultra-violet light. Fortunately, this can be done very readily by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower valence state.

Representative phenol derivatives useful as stabilizers include 4,4' - bis(2,6 - ditertiary - butylphenol); 1,3,5-trimethyl - 2,4,6 - tris[3,5 - ditertiary-butyl-4-hydroxybenzyl]benzene and 4,4' - butylidene - bis(6 - tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N' - bis(beta-naphthyl)-p-phenylenediamine, N,N' - bis(1 - methylheptyl) - p - phenylene diamine and either phenyl-betanaphthyl amine or its reaction products with aldehydes. Mixtures of hindered phenols with esters of thiodipropionic acid, mercaptides and phosphite esters are particularly useful. Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiber glass. In general, these additives have the effect of increasing the modulus of the material at various elongations. Compounds having a range of hardness values can be obtained by blending hard and soft polyesters of this invention.

The copolyesters of this invention have superior physical properties. They are particularly outstanding in their resistance to swell in liquids, e.g., oil and water and have superior tear strength. Thus the polymer can be cross-head extruded for hose (particularly for carrying oil), wire, cable and other substrate covers which would need high tear strength. They can also be readily calendered to produce films and sheeting or to produce calender-coat woven and nonwoven fabrics and other substances.

In finely divided form, the polymers of this invention offer the above-mentioned processing advantages for procedures employing powdered thermoplastics. In addition, they can be used in crumb form. The unique flow characteristics of these polymers give excellent definition on molded surfaces and facilitate fusion bonding procedures such as rotation molding (either one or two axis methods, slush molding, and centrifical molding as well as powder coating techniques such as fluidized bed, electrostatic spray, flame spray, flock coating, powder flow coating, cloud chamber and heat fused coating (for flexible substrates).

The melt viscosity and stability characteristics of these polymers offer advantages for use in certain coating and adhesive procedures such as dip, transfer, roller and knife coating and hot melt adhesives. These same advantages are useful in various combining and laminating operations such as hot roll, web and flame laminating as well as other thermoplastic heat sealing processes. The low melt viscosity of these polymers permits the use of more delicate substrates in combining, laminating and calendering operations and allows penetration into the substrate, if desired.

All parts, proportions and percentages disclosed herein are by weight unless otherwise indicated. The following examples further illustrate the invention.

EXAMPLES

The following ASTM methods are employed in determining the properties of the polymers prepared in the examples which follow.

| Property | ASTM Method |
|---|---|
| Modulus at 100% elongation $M_{100}$ | D412 |
| Modulus at 300% elongation, $M_{300}$ | D412 |
| Tensile at break, $T_B$ | D412 |
| Elongation at break, $E_B$ | D412 |
| Volume swell | D471 |
| Trouser tear | [1]D470 |

[1] Modified by use of 1.5″ x 3″ sample with 1.5″ cut on the long axis of the sample. This configuration prevents "necking down" at the point of tearing.

Example 1

A copolyester was prepared by placing the following materials in an agitated flask fitted for distillation:

| | Gm. |
|---|---|
| Poly(ethylene oxide) glycol [PEG]; number average molecular weight about 208 | 14.4 |
| 1,4-butanediol | 19.4 |
| Dimethyl terephthalate | 41.3 |
| Sym-di-beta-naphthyl-p-phenylenediamine | 0.165 |

A stainless steel stirrer with a paddle cut to conform with the internal radius of the flask and with a circular baffle ½ inch less in diameter than the inside of the flask was positioned with the paddle about ⅛″ from the bottom of the flask and the baffle about 2½″ from the bottom of the flask. Air in the flask was replaced with nitrogen. The flask was placed in an oil bath at 160–165° C. After the reaction mixture liquifies 0.36 ml. of catalyst solution was added. Agitation was initiated. Methanol distills from the reaction mixture as the temperature of the oil bath was slowly raised to 250–260° C. over a period of about 35 minutes. When the temperature reaches 250° C. the pressure was gradually reduced to 0.1 mm. Hg or less over a period of 40–50 minutes. The polymerization mass was agitated at 250–260° C./0.04 mm. Hg for 80–120 minutes. The resulting viscous molten product was scraped from the flask in a nitrogen (water and oxygen free) atmosphere and allowed to cool. The properties of the copolyester product are listed in Table 1 under compound A. The inherent viscosity was determined in m-cresol at 30° C. Samples for physical testing were prepared by compression molding at 232° C.

The catalyst solution was prepared as follows: Magnesium diacetate tetrahydrate was dried 24 hours at 150° C. under vacuum with a nitrogen bleed. A mixture of 11.2 gm. of the dried magnesium diacetate and 200 ml. of methanol was heated at reflux for 2 hours. The mixture was cooled and 44.4 ml. of tetrabutyl titanate and 150 ml. of 1,4-butanediol was added with stirring.

Compounds B and C of Table 1 whose compositions lie outside the limits of this invention were included for comparison purposes. Compounds B and C are prepared by substantially the same procedure used for compound A, with the exception that the poly(ethylene oxide) glycol having a molecular weight of 208 was replaced by glycol of 398 and 600 molecular weight.

TABLE 1

| Compound | A | B | C |
|---|---|---|---|
| 1,4-butylene terephthalate ester units (wt. percent) | 57.38 | 57.38 | 57.38 |
| PEG mol wt | 208 | 398 | 600 |
| Inherent viscosity | 1.2 | 1.3 | 1.2 |
| $M_{100}$ | 2,500 | 2,120 | 1,915 |
| $M_{300}$ | 2,740 | 2,310 | 2,390 |
| $T_B$ | 5,600 | 5,700 | 5,840 |
| $E_B$ | 540 | 655 | 680 |
| Trouser tear, 50 in./min | 514 | 259 | 200 |
| Percent volume swell after— | | | |
| 14 days/25° C., water | 1.2 | 4.2 | 10.3 |
| 7 days/100° C., water | 0.9 | 1.8 | 3.1 |
| 7 days/100° C., ASTM, No. 3 oil | 3.3 | 4.2 | 4.5 |
| DSC M.P. (° C.) | 173 | 181 | 173 |

The data show that compound A has more than double the tear strength of compounds B or C. Compounds B and C have twice the swell in hot or cold water as does compound A. In addition, compound A is superior in oil swell.

Example 2

A copolymer was prepared in a manner similar to that of Example 1 using the following materials:

| | |
|---|---|
| Poly(ethylene oxide) glycol; number average molecular weight about 208, gm. | 16.9 |
| 1,4-butanediol, gm. | 16.9 |
| Dimethyl isophthalate, gm. | 8.0 |
| Dimethyl terephthalate, gm. | 32.0 |
| Sym-di-beta-naphthyl-p-phenylenediamine, gm. | 0.165 |
| Catalyst solution, Example 1, ml. | 0.36 |

Samples for physical testing were prepared by compression molding at 216° C. The physical properties of the copolyester product are listed in Table 2 under compound D.

Compounds E and F of table 2 whose compositions lie outside the limits of this invention are included for comparison purposes. Compounds E and F are prepared by substantially the same procedure used for compound D, with the exception that the PEG, molecular weight 208 is replaced by PEG molecular weight 398 or 600.

TABLE 2

| Compound | D | E | F |
|---|---|---|---|
| 1,4-butylene terephthalate ester units (wt. percent) | 40 | 40 | 40 |
| 1,4-butylene isophthalate ester units (wt. percent) | 10 | 10 | 10 |
| PEG mol wt | 208 | 398 | 600 |
| Inherent viscosity | 1.0 | 1.3 | 1.3 |
| $M_{100}$ | 1,310 | 995 | 975 |
| $M_{300}$ | 1,490 | 1,380 | 1,300 |
| $T_B$ | 3,400 | 4,100 | 3,375 |
| $E_B$ | 610 | 805 | 865 |
| Trouser tear, 50 in./min | 544 | 200 | 125 |
| Percent volume swell after— | | | |
| 14 days/25° C., water | 1.5 | 5.6 | 14.6 |
| 7 days/100° C., water | 1.7 | 2.1 | 3.6 |
| 7 days/100° C., ASTM, No. 3 oil | 5.3 | 7.2 | 7.9 |

Tear strength of compound D is superior to compounds E and F; the oil and water swell of compound D is also substantially superior to compounds E and F.

Example 3

A copolymer is prepared in a manner similar to that of Example 1 using the following materials:

| | |
|---|---|
| Tetraethylene glycol (PEG 194), gm. | 18.5 |
| 1,4-butanediol, gm. | 14.8 |
| Dimethyl isophthalate, gm. | 7.9 |
| Dimethyl terephthalate, gm. | 31.8 |
| Sym-di-beta-naphthyl-p-phenylenediamine, gm. | 0.165 |
| Catalyst solution, Example 1, ml. | 0.36 |

Samples for physical testing were prepared by compression molding at 216° C. The physical properties of the copolyester product are listed in Table 3 under compound G.

Compound H of Table 3 whose composition lies outside the limits of this invention is included for comparison purposes. The preparation of compound H is similar to that of compound G.

TABLE 3

| Compound | G | H |
|---|---|---|
| 1,4-butylene terephthalate ester units (wt. percent) | 35 | 35 |
| 1,4-butylene isophthalate ester units (wt. percent) | 8.75 | 0 |
| PEG mol wt | 194 | 194 |
| Inherent viscosity | 1.1 | 1.1 |
| $M_{100}$ | 1,000 | 990 |
| $M_{300}$ | 1,075 | 1,010 |
| $T_B$ | 3,260 | 3,200 |
| $E_B$ | 600 | 890 |
| Trouser tear, 50 in./min | 384 | 143 |

Compound G, which illustrates the instant invention, has a much superior tear strength when compared to compound H. Compound H does not contain the necessary isophthalate ester units.

What is claimed is:

1. A segmented thermoplastic copolyester elastomer consisting essentially of a multiplicity of recurring ether ester units and ester units joined head-to-tail through ester linkages, said ether ester units being represented by the formula I 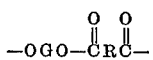

and said ester units being represented by the formula

II 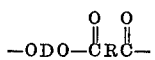

where G is a divalent radical remaining after the removal of terminal hydroxyl groups from a poly(alkylene oxide) glycol having a molecular weight of about 150–250 and a carbon to oxygen ratio of about 1.5–2.4; R is a divalent radical remaining after removal of carboxyl groups from a dicarboxylic acid having a molecular weight less than about 300 and D is a divalent radical other than G remaining after removal of hydroxyl groups from a diol having a molecular weight less than about 250; provided, that 30–65% by weight of the copolyester consists of 1,4-butylene terephthalate ester units and 0.20% by weight of the copolyester consists of additional ester units which form a homopolymer in the fiber-forming molecular weight range having a melting point of at least 100 C., said additional ester units being present in an amount of at least 6% by weight when less than 45% by weight of the copolyester consists of 1,4-butylene terephthalate ester units.

2. A segmented copolyester of claim 1 wherein the poly(alkylene oxide) glycol is poly(ethylene oxide) glycol.

3. A segmented copolyester of claim 2 wherein the polyethylene oxide glycol has a molecular weight of about 190–240.

4. A segmented thermoplastic copolyester of claim 1 wherein substantially all of the dicarboxylic acid reactant is terephthalic acid.

5. A segmented thermoplastic copolyester of claim 1 wherein the dicarboxylic acid reactant is a mixture of terephthalic acid and isophthalic acid.

6. A segmented thermoplastic copolyester of claim 1 wherein substantially all of the diol having a molecular weight less than 250 is 1,4-butanediol.

7. A segmented copolyester of claim 1 wherein the ester units constitute about 50–62% by weight of the polymer.

8. A segmented copolyester of claim 1 wherein the dicarboxylic acid is terephthalic acid, the poly(ethylene oxide) glycol has a molecular weight of about 190–240 and the diol having a molecular weight less than 250 is 1,4-butanediol.

9. A segmented copolyester of claim 8 wherein the ester units constitute about 50–62% by weight of the polymer.

References Cited
UNITED STATES PATENTS

| | | |
|---|---|---|
| 2,865,891 | 12/1958 | Michel. |
| 3,013,914 | 12/1961 | Willard. |
| 3,023,192 | 2/1962 | Shivers. |
| 3,651,014 | 3/1972 | Witsiepe. |

MELVIN GOLDSTEIN, Primary Examiner

U.S. Cl. X.R.

260—40 R, 45.75 R, C, N, 45.8 N, 45.9 R, 45.95, 47 C, 75 H, S